United States Patent
Buberman

(10) Patent No.: US 11,498,774 B2
(45) Date of Patent: Nov. 15, 2022

(54) AUTOMATED MODULAR PLANT GROWING SYSTEM

(71) Applicant: Arkadi Buberman, Rishon Letsiyon (IL)

(72) Inventor: Arkadi Buberman, Rishon Letsiyon (IL)

(*) Notice: Subject to any disclaimer, the term of this patent is extended or adjusted under 35 U.S.C. 154(b) by 693 days.

(21) Appl. No.: 16/439,190

(22) Filed: Jun. 12, 2019

(65) Prior Publication Data

US 2019/0382211 A1 Dec. 19, 2019

(30) Foreign Application Priority Data

Jun. 19, 2018 (IL) .......................................... 260144

(51) Int. Cl.
| | | |
|---|---|---|
| *B65G 47/90* | (2006.01) | |
| *B25J 11/00* | (2006.01) | |
| *B25J 9/16* | (2006.01) | |
| *A01G 27/00* | (2006.01) | |
| *A01G 9/02* | (2018.01) | |

(52) U.S. Cl.
CPC ............. *B65G 47/90* (2013.01); *A01G 9/027* (2013.01); *A01G 9/028* (2013.01); *A01G 27/005* (2013.01); *B25J 9/1679* (2013.01); *B25J 11/00* (2013.01); *B65G 2201/0202* (2013.01)

(58) Field of Classification Search
CPC .. A01G 2009/003; A01G 9/027; A01G 9/028; A01G 9/045; A01G 27/005; A01G 31/045; B25J 5/007; B25J 5/02; B65G 47/90; B65G 47/901; B65G 47/907; B65G 2201/0202; B65G 9/008; B65G 21/22; B65G 2812/02069; B65G 1/0492

USPC ....................................... 47/65; 414/276, 279
See application file for complete search history.

(56) References Cited

U.S. PATENT DOCUMENTS

| | | | | |
|---|---|---|---|---|
| 3,686,792 A | * | 8/1972 | Barfield ................. | A01G 9/247 47/79 |
| 4,312,152 A | | 1/1982 | Drury et al. | |
| 4,497,132 A | * | 2/1985 | Whitcomb ............ | A01G 9/021 47/73 |
| 5,220,745 A | * | 6/1993 | Elliott .................. | A01G 27/005 47/79 |
| 6,092,330 A | * | 7/2000 | Pratt ....................... | A47G 7/06 47/33 |

(Continued)

FOREIGN PATENT DOCUMENTS

| | | | |
|---|---|---|---|
| DE | 3404300 A1 | * | 8/1985 |
| KR | 200417177 Y1 | * | 5/2006 |

(Continued)

OTHER PUBLICATIONS

English-language translation of KR 20170049386 A (Year: 2017).*
Machine Translation of SU 1319806.

*Primary Examiner* — Lisa L Tsang
(74) *Attorney, Agent, or Firm* — Preston Smirman; Smirman IP Law, PLLC

(57) ABSTRACT

An automated modular plant growing system includes a rack structure with primary guiding tracks and secondary guiding tracks transverse to each other, and upper guiding tracks in parallel and above the primary guiding tracks. The automated modular plant growing system also includes a plurality of mobile modules detachably connected to the upper guiding tracks and to a nutrient solution supply system.

6 Claims, 17 Drawing Sheets

(56) References Cited

U.S. PATENT DOCUMENTS

| | | | | |
|---|---|---|---|---|
| 6,138,403 A * | 10/2000 | Bartlett, Jr. | ............ | A01G 9/1423 47/18 |
| 7,020,997 B1 * | 4/2006 | Thomas | ................. | A01G 9/028 47/39 |
| 7,381,022 B1 * | 6/2008 | King | ................... | B65G 1/1375 414/807 |
| 7,681,357 B2 | 3/2010 | Dyas | | |
| 7,891,135 B2 * | 2/2011 | Laycock | ................ | A01G 9/028 47/68 |
| 9,075,412 B2 | 7/2015 | Dixon et al. | | |
| 9,422,108 B2 * | 8/2016 | Hognaland | ............ | B65G 1/137 |
| 9,516,822 B2 * | 12/2016 | Gonyer | ................. | A01G 31/02 |
| 9,682,822 B2 * | 6/2017 | Lindbo | ................. | G05B 15/02 |
| 10,136,587 B1 * | 11/2018 | Johnson | ................ | B65G 43/08 |
| 10,207,867 B2 * | 2/2019 | Brumm | .................... | B65G 1/02 |
| 10,660,282 B1 * | 5/2020 | Parrish | ................ | A01G 27/001 |
| 10,813,303 B2 * | 10/2020 | Hemerka | ................ | A01G 9/02 |
| 11,116,147 B1 * | 9/2021 | Chojnacki | ............ | A01G 9/0297 |
| 2002/0005011 A1 * | 1/2002 | Goldberg | ............... | A01G 9/028 47/65.5 |
| 2012/0321423 A1 * | 12/2012 | MacKnight | ....... | H01L 21/67276 414/664 |
| 2014/0017043 A1 * | 1/2014 | Hirai | ....................... | A01G 9/02 414/267 |
| 2017/0027110 A1 * | 2/2017 | Ito | .......................... | A01G 7/045 |
| 2017/0339846 A1 * | 11/2017 | Lawrence | ............ | A01G 9/1423 |
| 2018/0035625 A1 | 2/2018 | Lindbo et al. | | |
| 2019/0008103 A1 * | 1/2019 | Goldberg | ............... | G01C 21/00 |

FOREIGN PATENT DOCUMENTS

| | | | | |
|---|---|---|---|---|
| KR | 20170049386 A * | 5/2017 | | |
| SU | 1319806 | 6/1987 | | |
| WO | WO-2016172793 A1 * | 11/2016 | ............... | B65G 1/04 |
| WO | WO-2017081281 A1 * | 5/2017 | ................ | B25J 5/02 |

\* cited by examiner

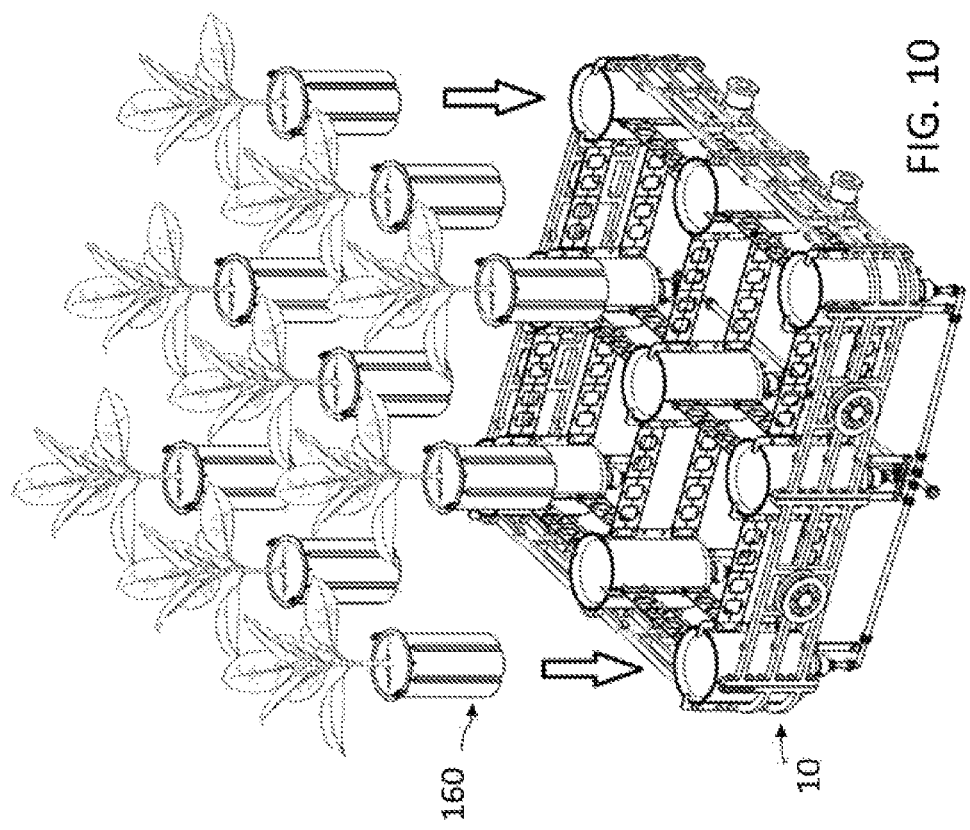
FIG. 10
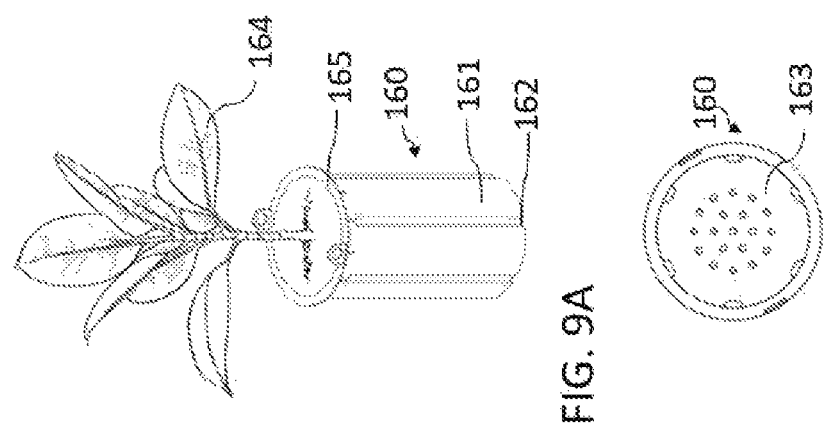
FIG. 9A
FIG. 9B

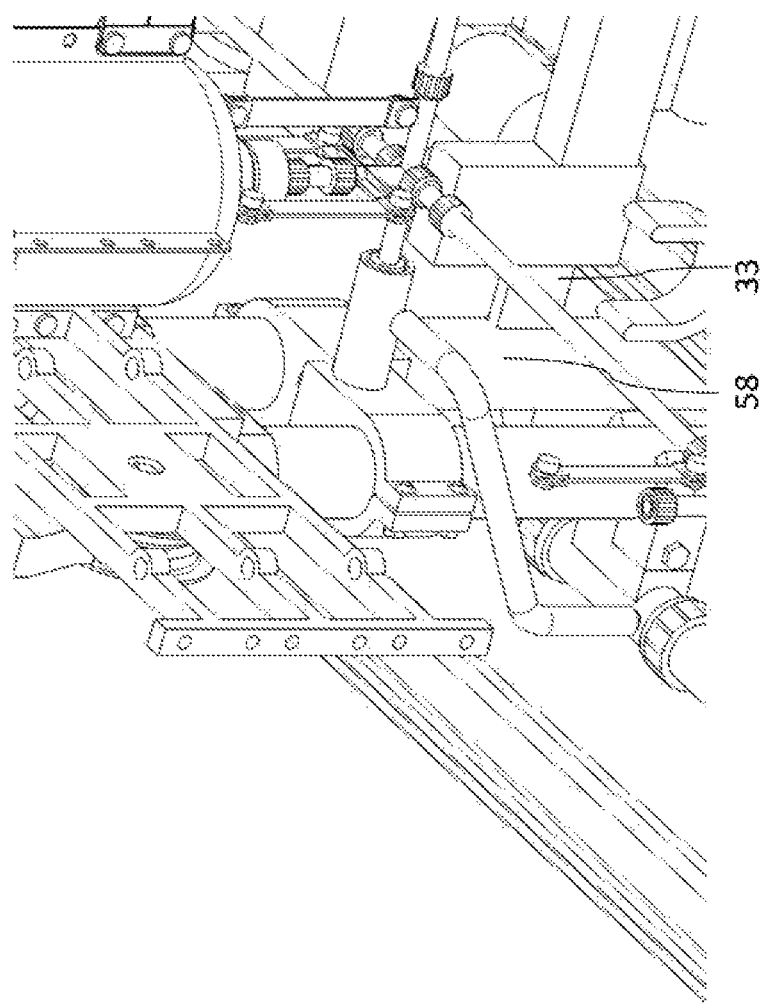

AUTOMATED MODULAR PLANT GROWING SYSTEM

CROSS-REFERENCE TO RELATED APPLICATIONS

The present patent application claims priority to Israeli Patent Application Serial No. IL260144 filed Jun. 19, 2018, the entire specification of which is incorporated herein by reference.

FIELD OF THE INVENTION

The present disclosure is directed to plant growing methods and systems, and more specifically to an automated farming of plants that greatly minimizes plant handling.

BACKGROUND OF THE INVENTION

In traditional and in hydroponic farming, plants are grown by supplying them with nutrients and water through conduits to enhance and promote plant growing under controlled environmental conditions.

Soil based plant growing systems and methods are well known in the art. The known soil-based plant growing systems and methods are difficult to automate, require large amounts of labor and resources.

Hydroponic plant growing systems are relatively a recent development and to date only been deployed in limited situations, being used for specialized purposes or to grow plants in specific environments. Nevertheless, hydroponic farming offers the possibility of more efficient plant growing than soil based farming, the ability to grow plants and generate produce in a wide variety of environments, and the ability to grow the produce near its point of final consumption. In addition, hydroponic growing systems allow for the growing of plant species which would not normally survive in a particular climate (e.g. desert).

SU1319806 (Zagorulko et. al) discloses a method and system of hydroponic growing of plants in interconnected horizontal tubes. However, due to the design of the system described in SU1319806 the plants grown in the interconnected tubes cannot be moved or relocated to another place for additional processing.

SUMMARY OF THE INVENTION

An automated modular plant growing system of the present invention includes a nutrient solution supply system, a rack structure with guiding tracks and mobile modules that contain plants in individual containers. The mobile modules are set on the rack structure and connected to a nutrient solution supply system by a robotic manipulator. The automated modular plant system of the present invention could be set on an open ground, on rooftops of buildings, shopping malls, or on a designated platform. The automated modular plant system of the present invention alternatively could be located inside a greenhouse or inside any other suitable structure.

BRIEF DESCRIPTION OF THE DRAWINGS

By way of example, embodiments of the present invention will now be described with reference to the accompanying figures of drawings in which:

FIG. 9A is a perspective view a plant pot of the plant container of an embodiment of an automated modular plant growing system of the present invention.

FIG. 9B is a top view a plant pot of a plant container of an embodiment of an automated modular plant growing system of the present invention.

FIG. 10 is a perspective view of potted plants and a mobile module of an embodiment of an automated modular plant growing system of the present invention.

FIGS. 17, 18, 19 are perspective views of a connection between a module liquid connector of a mobile module and a main liquid conduit of an embodiment of an automated modular plant growing system of the present invention.

DETAILED DESCRIPTION OF THE INVENTION

In the following detailed description of the invention, numerous specific details are set forth in order to provide a thorough understanding of the invention. However, it will be obvious to one skilled in the art that the invention may be used without these specific details. In other instances well-known methods, procedures, components, and elements are not described here in detail so as not to unnecessarily obscure aspects of the invention. It will be readily understood that the components of the present invention, as generally described and illustrated in the figures, may be arranged and designed in a wide variety of different configurations. Thus, the following more detailed description of the embodiments of the devices and methods of the present invention, as represented in the figures, is not intended to limit the scope of the invention, but is merely representative of selected embodiments of the invention.

Figure 1:
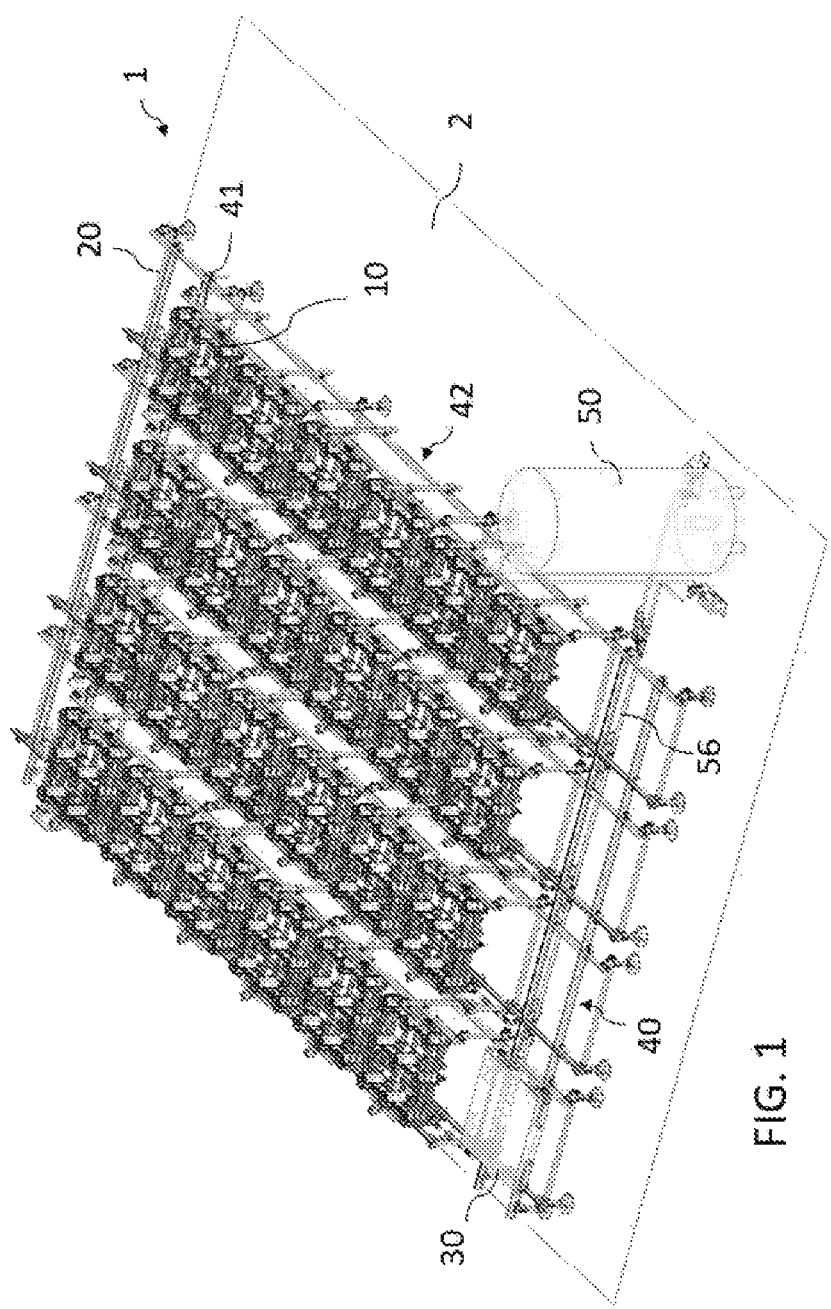
FIG. 1 is a perspective view of an embodiment of an automated modular plant growing system of the present invention.
Figure 2:
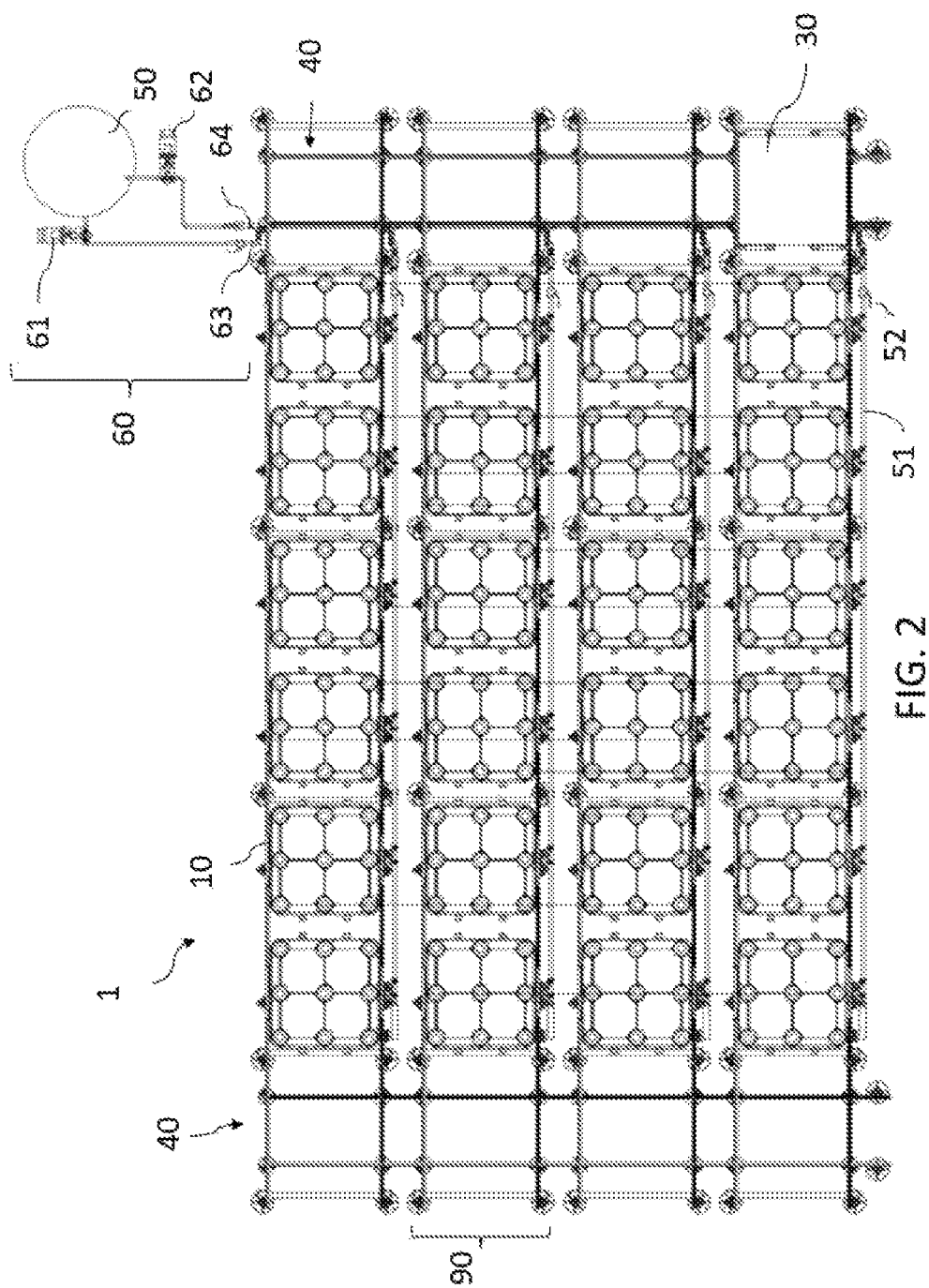
FIG. 2 is a top view of an embodiment of an automated modular plant growing system of the present invention.
Figure 3:
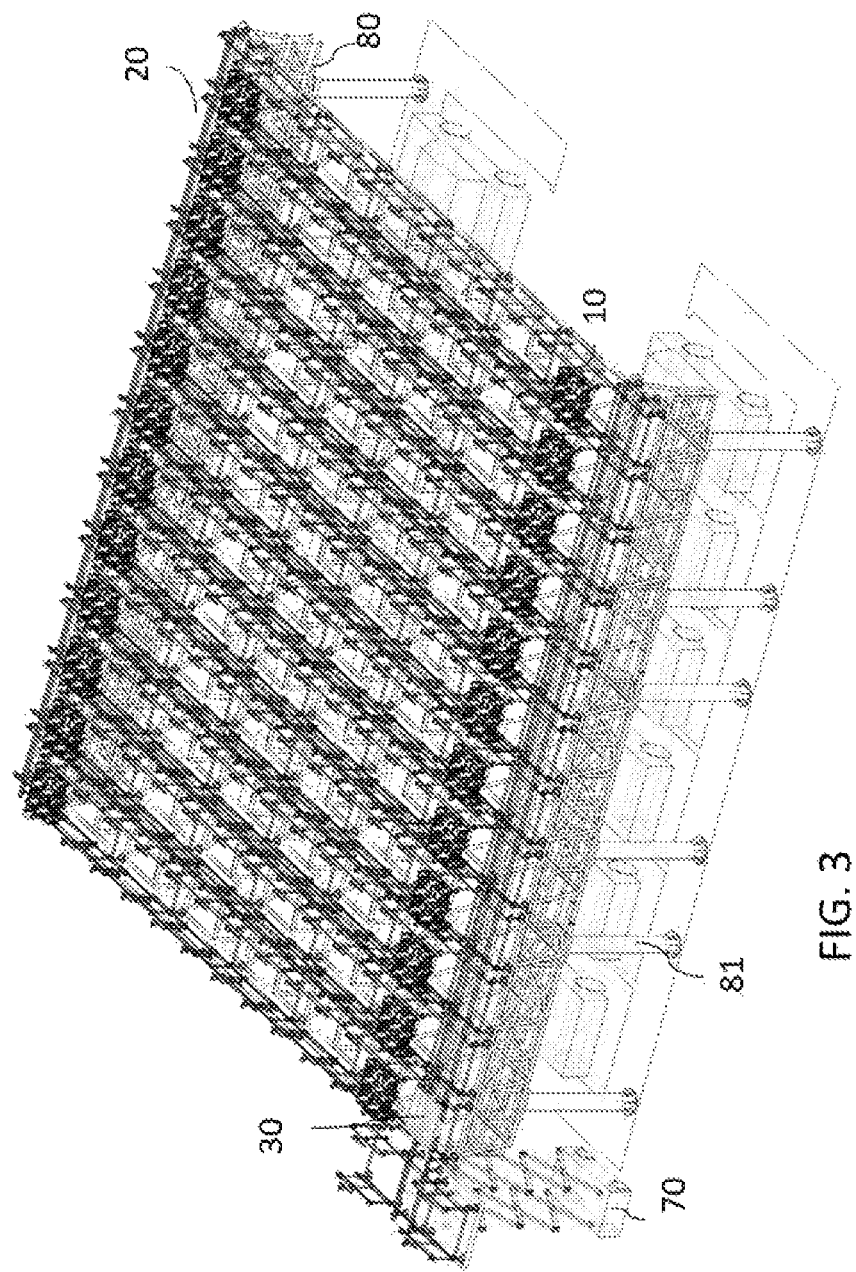
FIG. 3 is perspective view of an embodiment of an automated modular plant growing system of the present invention positioned above a parking lot.
Figure 4:
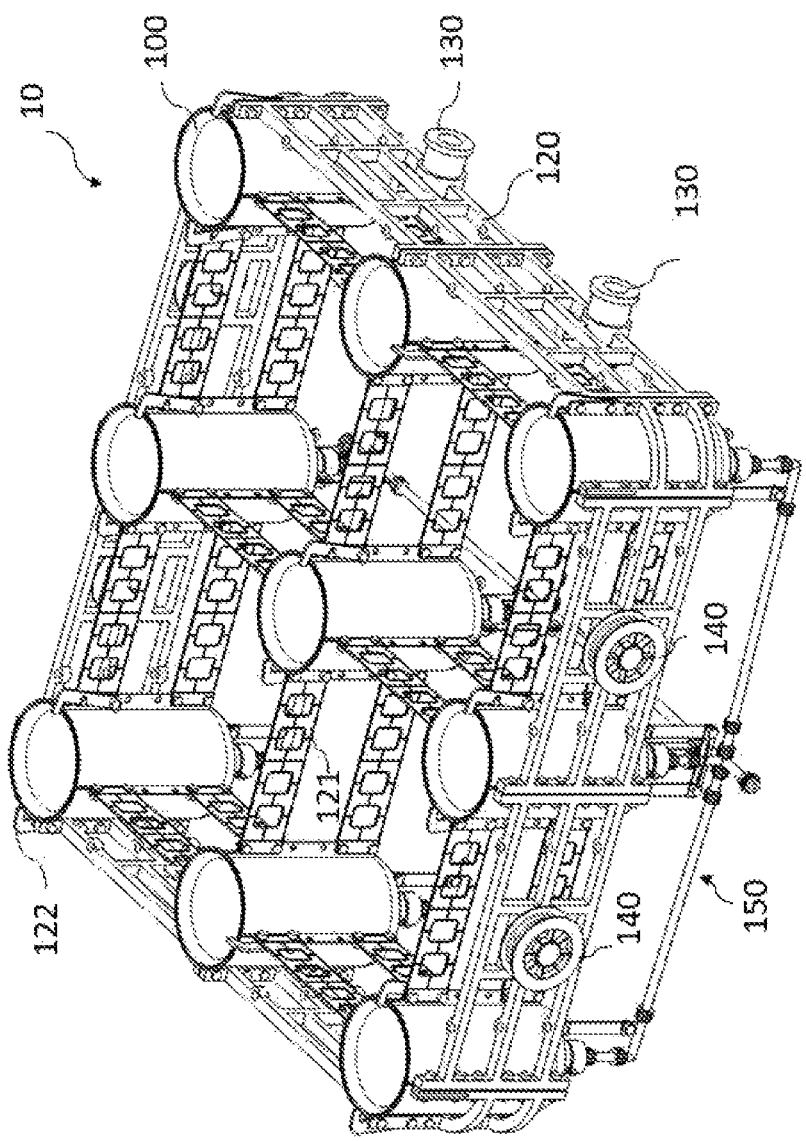
FIG. 4 is a perspective view of a mobile module of an embodiment of an automated modular plant growing system of the present invention.
Figure 5:
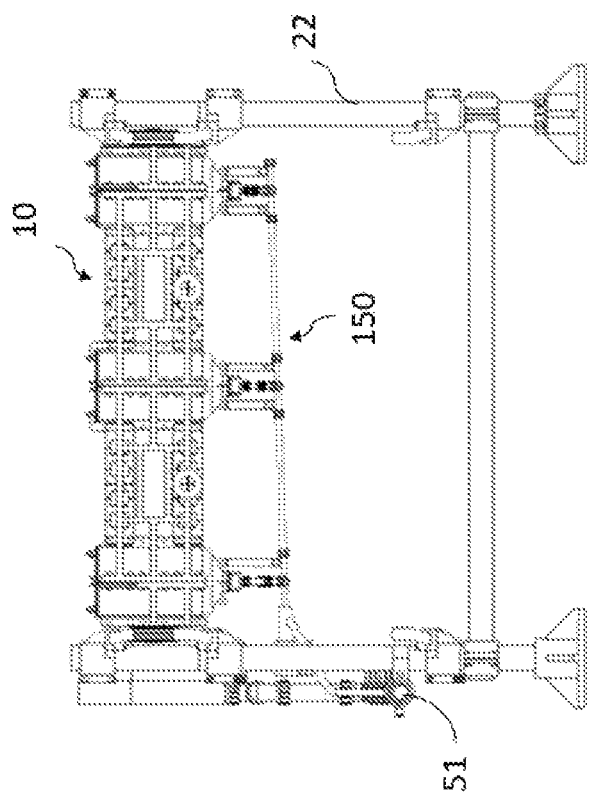
FIG. 5 is a side view of a mobile module of an automated modular plant growing system of the present invention.
Figure 6:
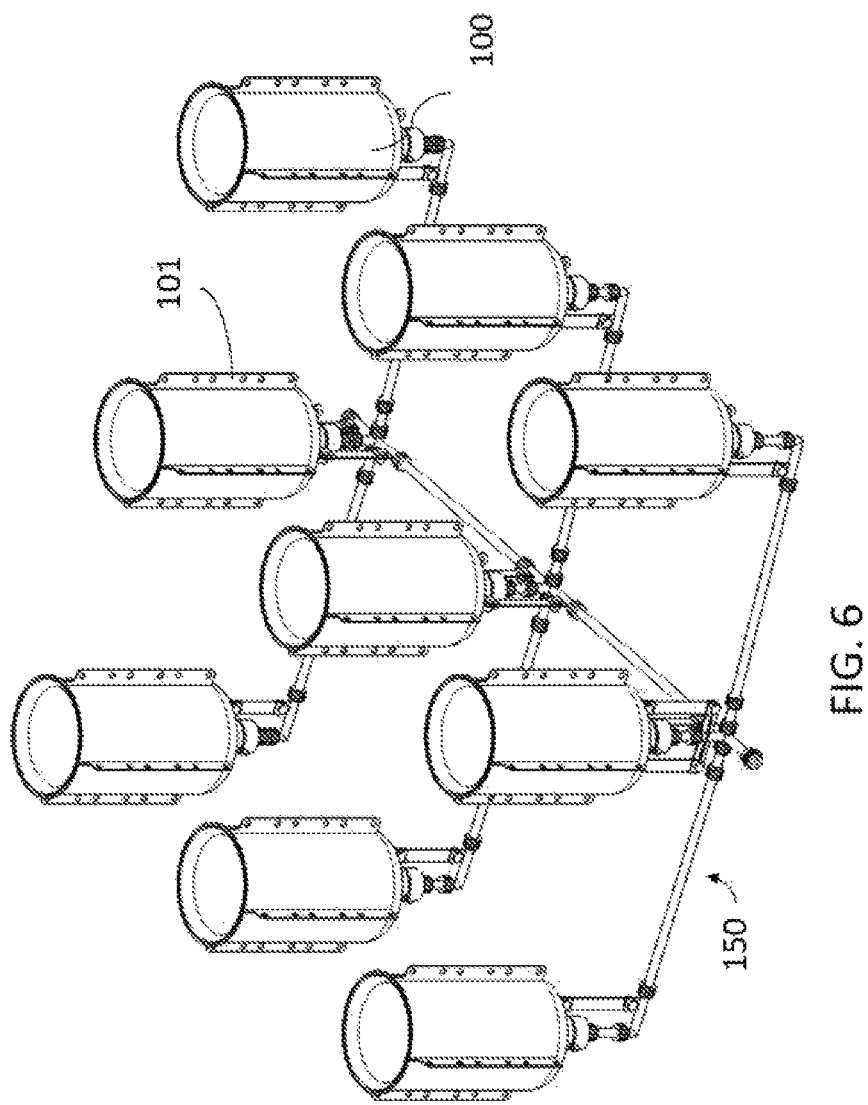
FIG. 6 is a perspective view of plant containers connected to a liquid conduit system of an embodiment of an automated modular plant growing system of the present invention.
Figure 7:
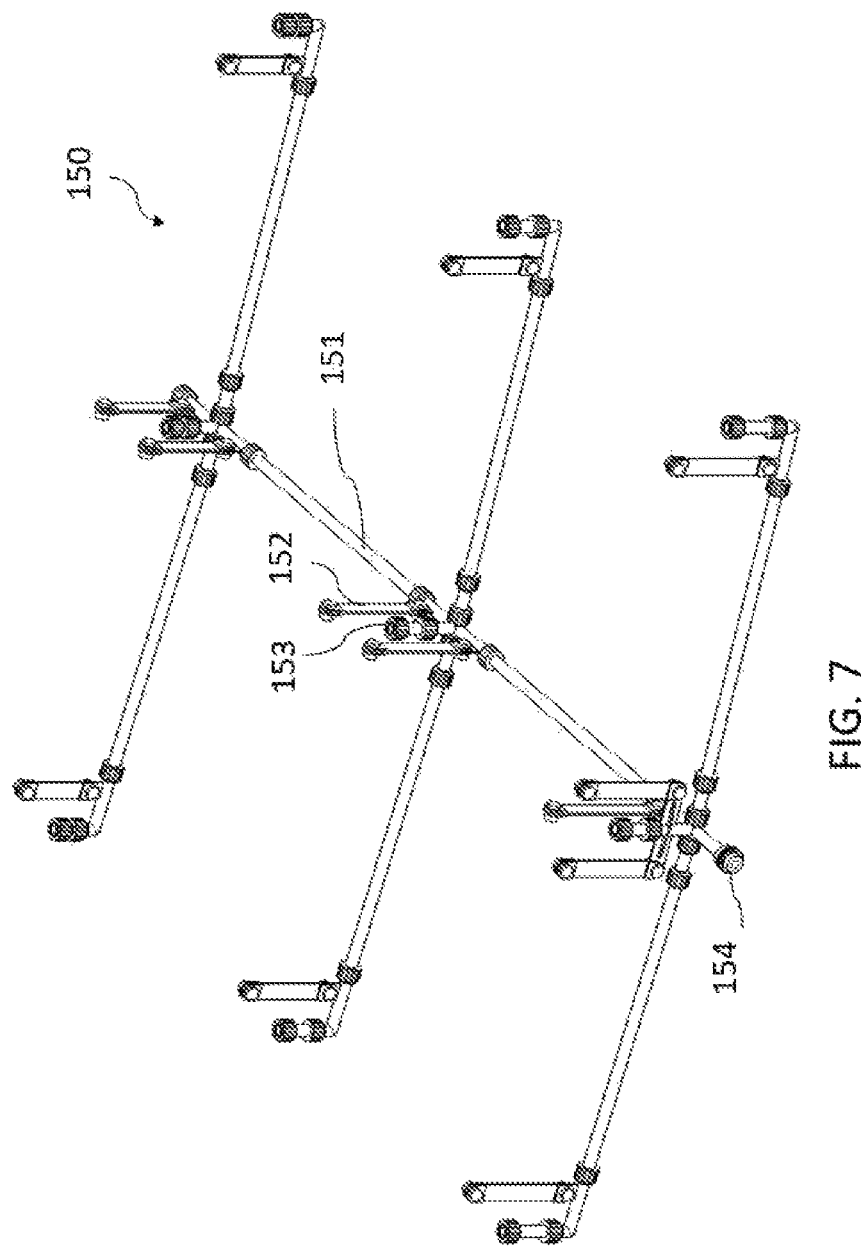
FIG. 7 is a perspective view of a liquid conduit system of an embodiment of an automated modular plant growing system of the present invention.
Figure 8C:
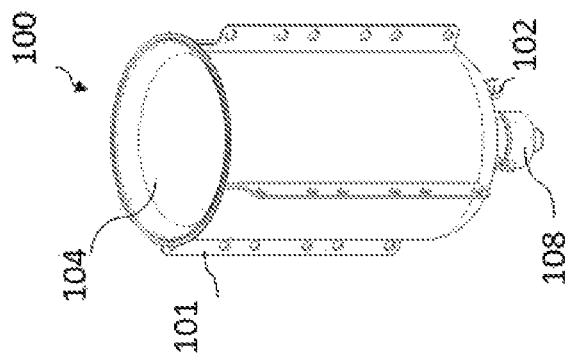
FIGS. 8A, 8B, 8C are perspective views of plant container components of an embodiment of an automated modular plant growing system of the present invention.
Figure 8B:
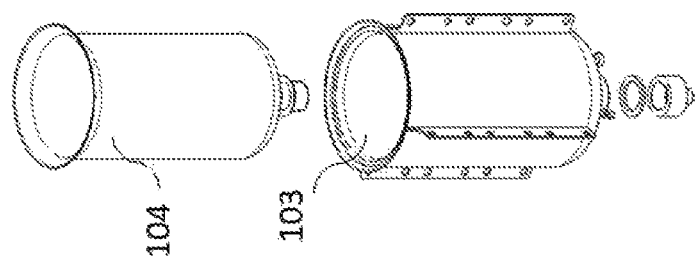
Figure 8A:
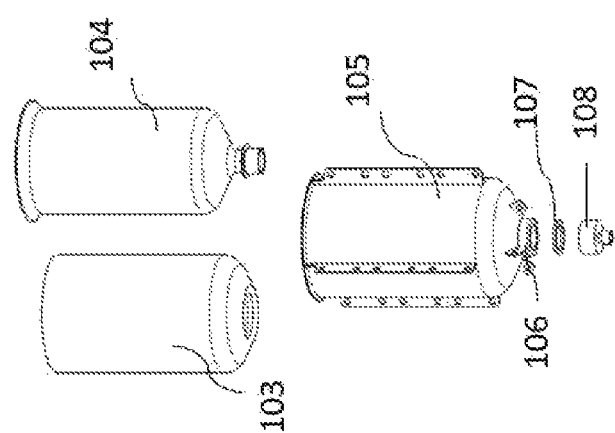
Figure 12:
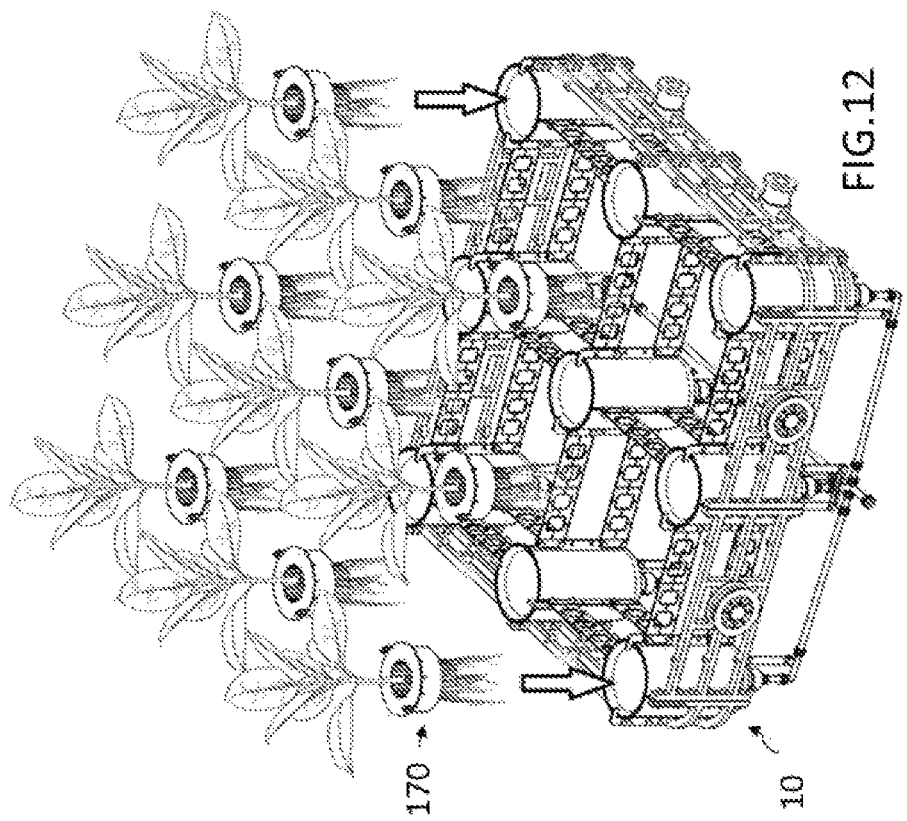
FIG. 12 is a perspective view of plants, plant holders and a mobile module of an embodiment of an automated modular plant growing system of the present invention.
Figure 11:
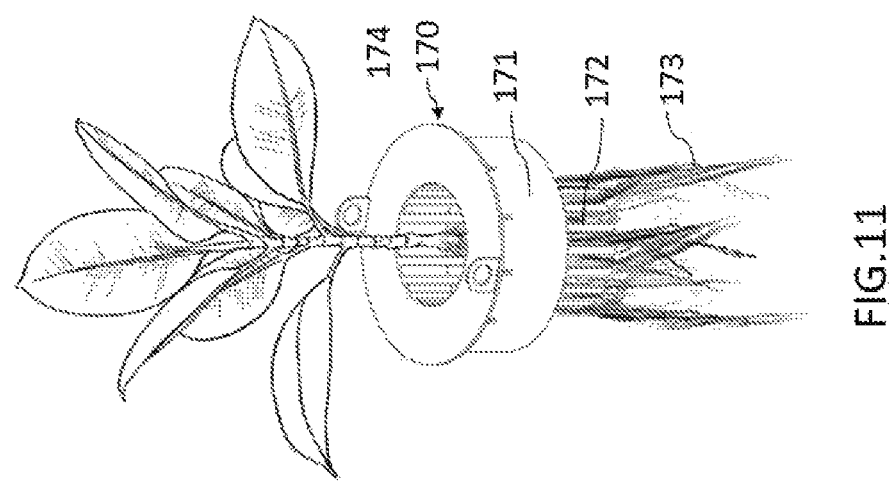
FIG. 11 is a perspective view of a plant holder of a plant container of an embodiment of an automated modular plant growing system of the present invention.
Figure 13:
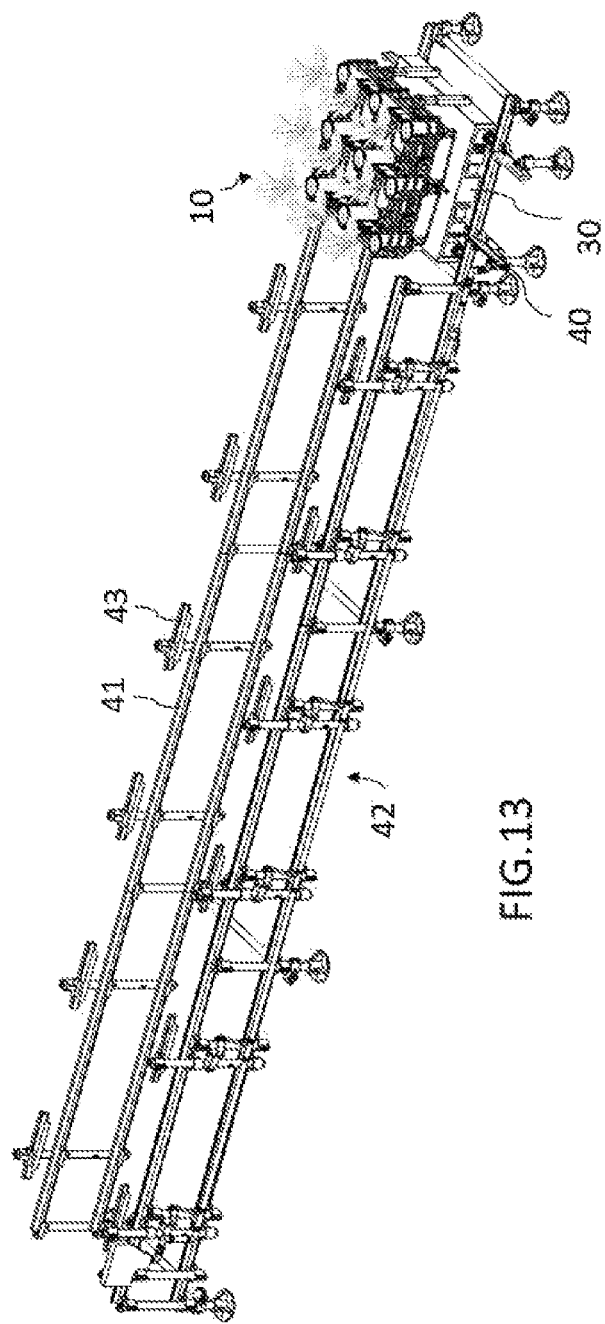
FIGS. 13, 14, 15 are perspective views of a mobile module with plants carried by a robotic manipulator and of a part of a rack structure of an embodiment of an automated modular plant growing system of the present invention.
Figure 14:
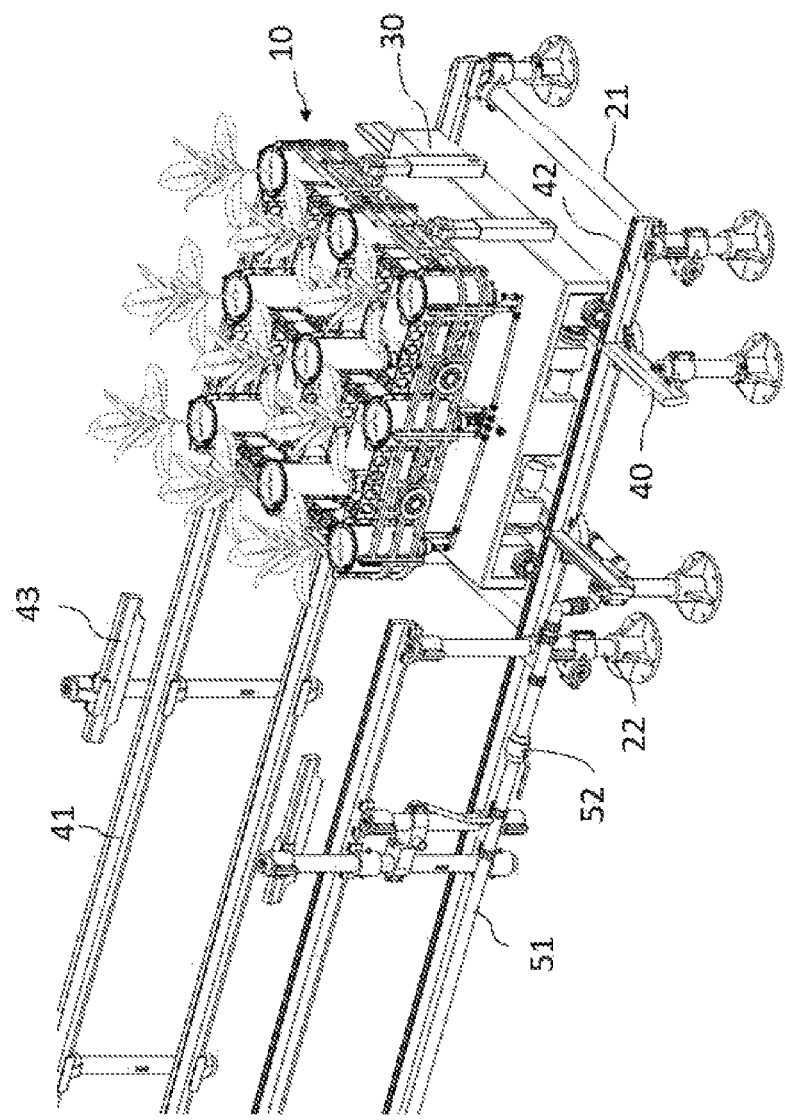
Figure 15:
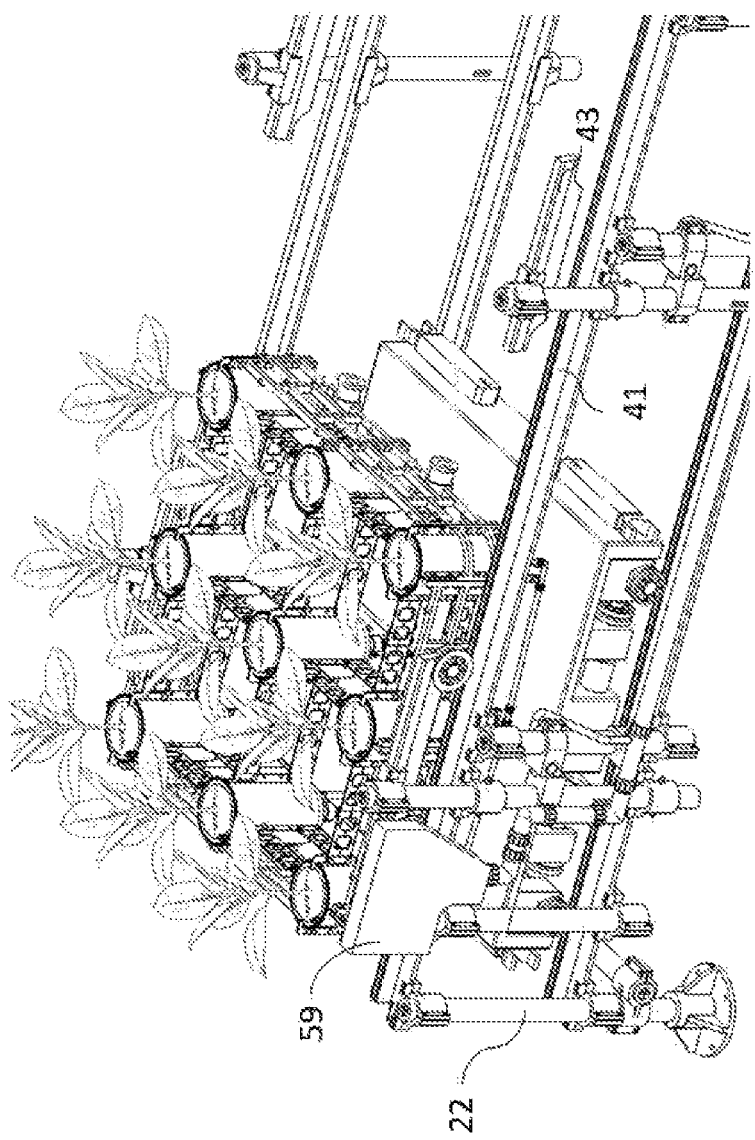
Figure 16A:
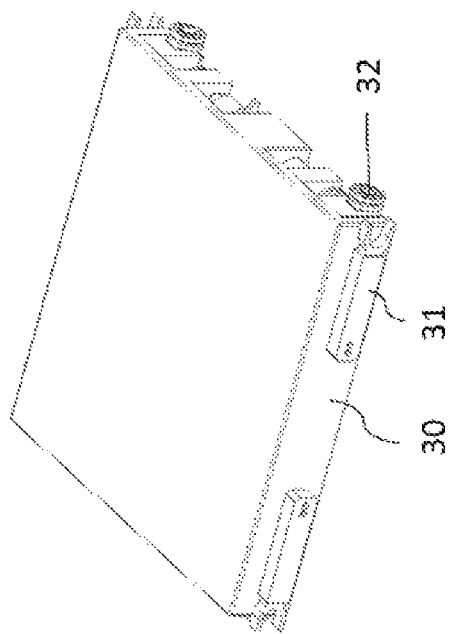
FIGS. 16A and 16B are perspective views of a robotic manipulator of an embodiment of an automated modular plant growing system of the present invention.
Figure 16B:
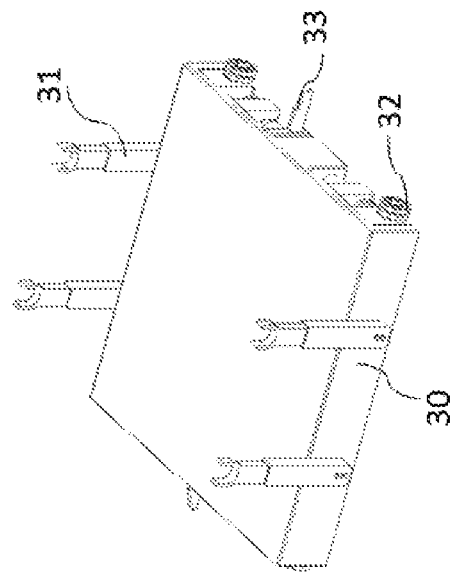
Figure 17:
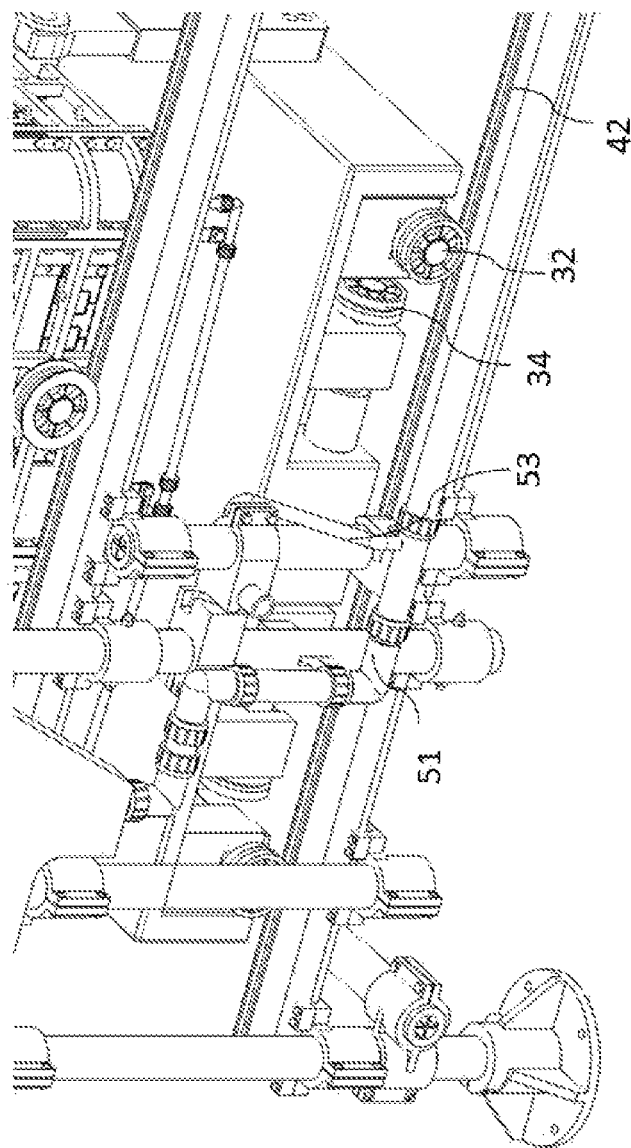
Figure 18:
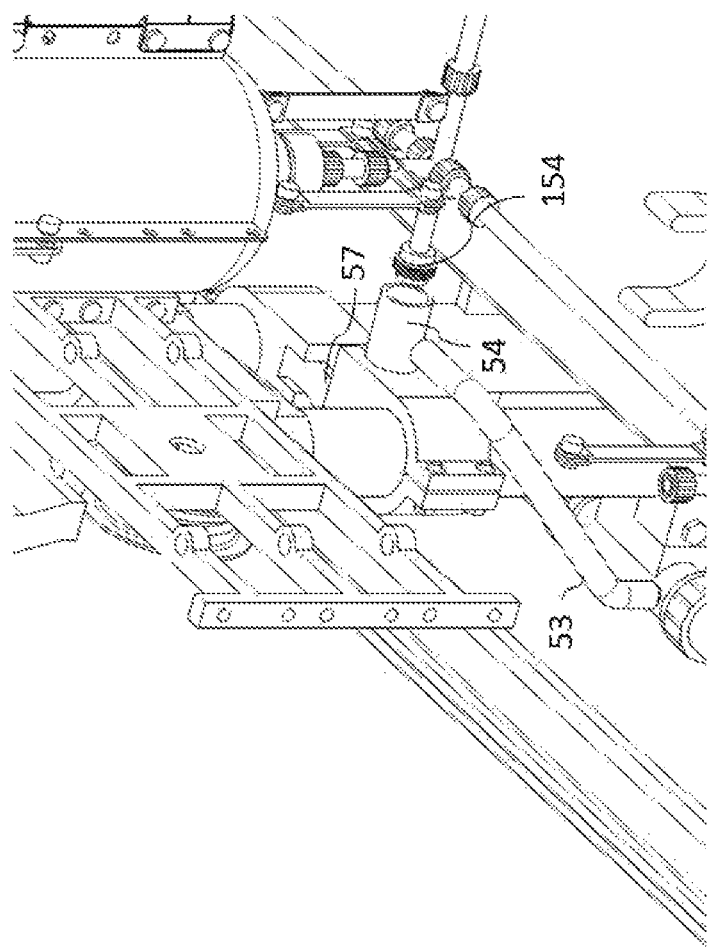

Referring now to the illustration of FIG. 1, a general layout of an automated modular plant growing system 1 in accordance with an embodiment of the invention is shown. The automated modular plant growing system 1 comprise (but not limited to) a plurality of mobile modules 10, a rack structure 20 for holding said plurality of mobile modules 10, a nutrient solution/water supply system 60 and a pallet-like robotic manipulator 30.

The rack structure 20 is comprised of primary guiding tracks 42 and secondary guiding tracks 40, which are transverse to each other. The guiding tracks 40, 42 are positioned at a certain height above the ground 2 and connected to supports 22. The rack structure 20 may also contain additional structural elements 21 connected to the supports 22. The structural elements 21 provide an additional stiffness to the rack structure 20. The rack structure 20 also includes upper guiding tracks 41 and fixating elements 43. The upper guiding tracks 41 are parallel to and positioned above the primary guiding tracks 42 and connected to the supports 22.

The nutrient solution supply system 60 includes a tank 50 connected to a main liquid conduit 51 via a primary liquid conduit 56, via pumps 61, 62 and valves 63, 64.

The mobile module 10 includes a plurality of plant containers 100 connected to a liquid conduit system 150.

The plant container 100 is comprised of a light reflective cylindrical outer shell 105; an insulator 103 placed inside the outer shell 105; an inner shell 104 positioned inside the insulator 103; an adaptor 108 that connects the plant container 100 to the liquid conduit system 150; and a gasket 107 positioned between the adaptor 108 and an outer shell opening 106. The plant container 100 also includes side flanges 101 for attaching an internal frame 121 that connects adjacent containers 100 to each other. The mobile module 10 also includes an external frame 120, which is fixated to the side flanges 101 of the plant containers 100 located on the perimeter of the mobile module 10.

The liquid conduit system 150 includes a plurality of interconnected pipes or liquid conduits 151, attached to the plant containers 100 via liquid connection means 153. The liquid conduit system 150 also includes a plurality of connectors 152 that mechanically connect the liquid conduit system 150 to bottom flanges 102 of the plant containers 100. To facilitate liquid flow from the liquid conduit system 150 to the main liquid conduit 51, the liquid conduit system 150 is inclined or tilted towards the main liquid conduit 51.

The plant container 100 is designed to receive a plant pot 160 or a plant holder 170. The plant pot 160 is comprised of a cylindrical body 161 with a plurality of vertical liquid retaining channels 162 and a perforated bottom 163. The plant pot 160 is configured to contain one single plant 164 and a natural or artificial/synthetic soil 165. The plant holder 170 is comprised of an outer upper portion 171 and a slotted inner portion 172. The slotted inner portion 172 is adapted to hold a plant 174 while allowing its roots 173 to protrude through the openings of the inner portion 172. The plant holder 170 or plant pot 160 is fixated to the plant container 100 by at least one latch 122 pivotally connected to the side flange 101 of the plant container 100.

The robotic manipulator 30 includes four independently driven primary wheels 32 that allow the robotic manipulator 30 to move on the primary guiding tracks 42, and four independently driven secondary wheels 34 for movement of the robotic manipulator on the secondary guiding tracks 40. The wheels 32, 34 are designed to extend vertically or retract, in order to move either on the primary guiding tracks 42 or on the secondary guiding tracks 40. The robotic manipulator 30 further includes rotating telescopic arms 31 designed to lift and carry the mobile module 10 by its trunnion-like handles 130.

The robotic manipulator 30 is either preprogrammed or instructed in real time to carry mobile modules 10 to a predetermined position on the rack structure 20 and attach them to the upper guiding tracks 41 by fixating module wheels 140 with the fixating elements 43. The robotic manipulator 30 is also instructed to connect the modules 10 to the main liquid conduit 51. This is done by connecting a module liquid connector 154 to a main liquid connector 54, and connecting the main liquid connector 54 via a flexible liquid conduit 53 to the main liquid conduit 51.

The connection of the module liquid connector 154 to the main liquid connector 54 is done by operating a lever 33 of the robotic manipulator 30. The lever 33 engages and pulls down an elongated element 58, that in turn pushes the main liquid connector 54 (by redirecting force from a vertical direction to a horizontal direction with a diagonal guide 57) towards the module liquid connector 154.

During the watering cycle the valves 52, 63 are open and valve 64 is closed. The pump 61 pumps the nutrient solution/water from the tank 50 to the liquid conduit system 150 and to the plant containers 100 until a desired level of liquid is achieved. The liquid level is monitored by a liquid level gauge 59. After a watering of the plants is over, the valve 63 closes and the valve 64 opens. Pump 62 pumps the nutrient solution/water back through a filter system (not shown) to the tank 50. During or before the watering cycle, it may be decided that certain module rows 90 should be exempt from receiving the nutrient solution/water. In that case, those module rows 90 are kept disconnected from the nutrient solution/water supply system 60 by keeping the valve 52 of each of those module rows 90 closed.

Before and after the watering cycle modules 10 may be moved and rearranged on the rack structure 20 by one or more robotic manipulators 30 moving on the secondary guiding tracks 40 located on the opposite sides of the rack structure 20.

An automated modular plant growing system of present invention could be positioned on the ground, on the rooftops of buildings, shopping moles, inside a greenhouse, etc. An automated modular plant growing system of present invention could also be positioned above a parking lot, on a dedicated platform 80, which can be elevated from the ground and rested on pillars 81. A scissor lift 70 or any other aerial lift platform can be used to add/remove mobile modules or robotic manipulators to/from the elevated structure.

The automated modular plant growing system 1 can be used to reduce heating of buildings (if positioned on a rooftop); increase oxygen levels in its vicinity, and decrease levels of $CO_2$.

Although an illustrative embodiment has been shown and described, a wide range of modification change and substitution is contemplated in the foregoing disclosure, and in some instances, some features of the embodiment may be employed without a corresponding use of other features. Accordingly, it is appropriate that the appended claims are construed broadly and in a manner consistent with the scope of the embodiment disclosed herein.

What is claimed is:

1. An automated modular plant growing system, comprising:

a rack structure comprising primary guiding tracks, secondary guiding tracks and upper guiding tracks, said upper guiding tracks are positioned in parallel to the primary guiding tracks and above said primary and secondary guiding tracks, and wherein said primary guiding tracks and secondary guiding tracks are transverse to each other;

mobile modules comprising plant containers connected to a liquid conduit system, said mobile modules are attached to the upper guiding tracks by fixating mobile module wheels with fixating elements of the rack structure as the mobile modules are transported along the primary guiding tracks;

wherein each of the plant containers is designed to contain only one single plant; and a nutrient solution supply system detachably connected to the liquid conduit system, and wherein said liquid conduit system is inclined towards a main liquid conduit.

2. The automated modular plant growing system of claim 1, further comprising:

at least one robotic manipulator designed to move on the primary and secondary guiding tracks, said robotic manipulator is configured to move and rearrange the mobile modules on the rack structure;

wherein said robotic manipulator is further configured to connect and disconnect the liquid conduit system to or from the nutrient solution supply system.

3. The automated modular plant growing system of claim 2, wherein each of the plant containers comprise a light reflective outer shell, an inner shell positioned inside the outer shell, an insulator positioned between the outer and the inner shells, and a plant pot or plant holder positioned inside the inner shell.

4. The automated modular plant growing system according to claim 2, wherein said rack structure is a multi-level rack structure.

5. The automated modular plant growing system of claim 2, wherein said at least one robotic manipulator has a form of a pallet and comprises four primary wheels and four secondary wheels, and four rotatable telescopic arms.

6. The automated modular plant growing system of claim 2, wherein said automated modular plant growing system is a rooftop-based automated modular plant growing system.

* * * * *